Patented Sept. 27, 1932

1,879,483

UNITED STATES PATENT OFFICE

HAROLD ROBERT RAFTON, OF ANDOVER, MASSACHUSETTS, ASSIGNOR TO RAFFOLD PROCESS CORPORATION, A CORPORATION OF MASSACHUSETTS

PRODUCTION OF IMPROVED ALKALINE FILLER

No Drawing.   Application filed February 13, 1930.  Serial No. 428,231.

This invention relates generally to the manufacture of paper and more particularly to the production of improved alkaline filler for use in the manufacture of paper.

The principal object of this invention is to provide a process of modifying the properties of alkaline filler to produce improved alkaline filler for use in papermaking.

An important object of the invention is to provide for the stabilization of the pH value of alkaline filler.

A further object of the invention is to provide for the temporary production of a substantially neutral or slightly acid condition of alkaline filler which is to be used in filling paper.

A further object is to reduce the viscosity of alkaline filler coating mixes to enhance their workability on coating machines.

Other objects and advantages of this invention will become apparent during the course of the following description.

Alkaline filler has hitherto found a limited use in the papermaking industry but that use has recently been notably extended. As result of this extended use a great deal of research has been directed to improvements of alkaline filler and to methods of improving the results obtained by its employment.

The use of alkaline filler in papermaking includes both its use as a filler in the body of the paper and also its use as a coating constituent. When used as a paper filler, it may be present in the mix when the mix is normally alkaline, or it may be desirable to create a condition of acidity in the presence of the alkaline filler even if such condition is only temporary. On the other hand, where alkaline filler is used in coating mixes such as are applied preferably to the surface of a previously made paper, such mixes are normally alkaline, even if only mildly so, as they customarily contain an alkaline solution of casein, and in such case the question of alkalinity of the filler becomes of less importance.

Alkaline filler may have a pH as high as 10 or 11 or more, and it is very desirable, especially in filling paper, to be able to minimize the alkalinity of the paper filler to be used in the paper mix.

I have found that the addition of suitable material such as alum, has the peculiar effect on the alkaline filler of producing practically a permanent reduction of its pH value. I prefer to conduct the treatment in the presence of a fluid, preferably water. I have found, for instance, that an alkaline filler such, for example, as calcium carbonate magnesium hydroxide, which ordinarily may have a pH value of 10-11 or more, will by the addition of a relatively small quantity of alum have its pH value reduced to the neighborhood of 8. I have also found that the pH will remain substantially at 8 for at least several days, or from the standpoint of use of the filler in a paper mill which normally takes place within several days of its production, the alkaline filler may be said to have its pH permanently reduced.

This is of particular advantage where alkaline filler is to be used in a paper mix, as the alkaline filler may thereby exert less solubilizing effect on other constituents of the mix and less tendency to form foam. When alkaline filler is to be so used, I may practice my invention by adding to the alkaline filler, preferably in aqueous suspension, at any time before its introduction to the paper mix, a small quantity of suitable material, preferably alum, say in the neighborhood of several per cent, mix the same, and then add the thus treated filler to the paper mix. I preferably add the alum in aqueous solution.

I have determined by test that no matter how much alum I add to an alkaline filler, even up to 30 per cent. on the bone dry weight of the alkaline filler, which in itself would be enough to dissolve a very appreciable percentage of the entire alkaline filler, I cannot permanently reduce the pH substantially below 8. The alkaline filler treated with 30 per cent. alum after standing a relatively brief time, say about five minutes, does not have its pH reduced substantially below 8, so that there does not appear to be any advantage in adding a larger quantity of alum than several per cent. From a practical standpoint I have found that 2 per cent. of alum calculated as weight of dry commercial alum on the weight of the dry alkaline filler is in certain cases sufficient to reduce the pH of the alkaline filler permanently to approximately 8.

On the other hand, I have discovered by experiment that the immediate result of the reaction between alum and alkaline filler is such that the pH produced is very materially below the final equilibrium point of approximately 8. In fact, the pH may be below the neutral point, that is, below 7, and in some cases it is reduced temporarily as low as 6, or even lower for a very brief interval of time. I have been able to utilize this discovery to great advantage, because I have found that although the pH eventually rises after a relatively short time (about five minutes) to a value of 8, nevertheless values approximately from 7 to 6.5 can be attained for a relatively short duration of time, but still for a sufficiently long duration to be useful in the papermaking process.

For instance, I have found that alkaline filler, such for example, as calcium carbonate magnesium hydroxide, to which 4 per cent. alum has been added, will have its pH reduced to about 7.–7.5, and that this will persist for a period of 90 seconds. With slightly larger quantities of alum, say 8 per cent. a pH of about 6.5 is maintained for 90 seconds.

In other words, for a period of 90 seconds, it is possible by pretreating the alkaline filler with alum to maintain a pH which is either practically neutral or even slightly acid, and as will be apparent from the explanation below, this is of very great importance in the use of alkaline filler in papermaking, particularly in connection with my new technique of adding various constituents to a paper mix under conditions favoring the minimizing of the time and/or intimacy of contact of the constituents of the mix, such as is disclosed in various of my copending applications.

For example, in my copending application Serial No. 304,167, filed September 5, 1928, I disclose a method of producing a sized paper filled with alkaline filler by the addition of alkaline filler at the wet end of the paper machine to a previously sized paper mix. In such case the alkaline filler does not have time to deteriorate substantially the sizing of the paper. However, I have found that in certain cases even the slight deteriorating effect which the alkaline filler may have is considerably minimized by the pretreatment of the alkaline filler with a small amount of alum just prior to the time when it is to be added at the wet end of the paper machine. By so doing, the pH of the alkaline filler may be reduced almost to neutrality or even to slight acidity and as this condition is maintained for a period of approximately 90 seconds, it will be apparent that, at the ordinary rates of speed at which paper machines are operated, the paper will be well on its way over the driers or, in fact, already on the reel before the temporary period during which the alkaline filler is held at a relatively low pH value will have been terminated. Moreover, this period will be sufficient to maintain substantially the larger quantity of alkaline filler which is turned cyclically in the tray waters to the mixing box in this substantially neutralized or slightly acidified condition because it is apparent that it ordinarily takes substantially less than 90 seconds to complete a cycle of this tray water from under the wire back to the mixing box and then back again to the wire where the water is separated from the formed web and falls into the trays.

Of course, it would seem to be the case that there would always be a certain residual quantity of alkaline filler which chances to escape incorporation in the paper web on several successive cycles and this portion naturally will have its temporarily reduced pH revert to a higher pH, but as will be apparent from the laws of chance the proportion of this "reverted" alkaline filler to the total alkaline filler present will be relatively slight and hence will be of little importance in affecting the sizing of the paper. As a matter of fact, in machine operation this slight amount of reverted alkaline filler is of little significance as it will have its slight alkalinity effectively neutralized by the excess of alum which normally comes through with the previously sized stock to the mixing box.

Of course, in such case as outlined above it is also desirable to return the stock reclaimed from the excess white water to the papermaking operation at the point of the dilution of the mix prior to its passage onto the web-forming device in order that the sizing may not be affected appreciably by the contact with the alkaline filler under conditions of relatively high concentrations and/or relatively long duration of time.

The herein described pretreatment of alkaline filler immediately prior to use is of advantage also in certain cases in the making of substantially unsized paper by adding alkaline filler at the wet end of the paper machine, which method is disclosed in various of my copending applications, for example, Serial Nos. 321,753 and 321,754, both filed November 24, 1928. It is particularly advantageous where old paper stock and/or coated broke is a part of the furnish and where the excess white water from the paper machine is reutilized to the greatest extent feasible, such as in the showers or the like, in order to make as nearly a closed system on the machine as possible. At certain times under such conditions even when alkaline filler and/or alum are used at the wet end of the paper machine there is a tendency to have trouble due to foam in the paper, and under these conditions the pretreatment of the alkaline filler just prior to its addition at the wet end of the paper machine prevents the alkalinity of the alkaline filler from acting upon those constituents which when alkalinized have foam-forming tendencies.

It is thus evident that the pretreatment of the alkaline filler with alum just prior to its addition at the wet end of the paper machine is of great advantage either in sized or unsized paper, and in this connection it will be apparent that this pretreated alkaline filler may be used as the only constituent added at the wet end of the paper machine, or, as is disclosed in other of my copending applications, in connection with one or more of the following constituents: alum, size, precipitated size, sodium silicate, precipitated sodium silicate, starch, stock recovered from the excess white water used in the cycle, any stock containing alkaline filler as an ingredient, and the like.

In practicing the phase of my invention wherein alkaline filler is added at the wet end of the paper machine, either in the manufacture of sized or substantially unsized paper, I add the desired amount of suitable material, preferably alum, preferably in solution, and preferably continuously, to the alkaline filler preferably in water suspension, just prior to the addition of the filler at the wet end of the paper machine. The streams of alkaline filler suspension and alum solution in properly regulated amounts are so arranged that they mix with one another usually by being both allowed to flow into a compartment of a flow box, where agitation additional to that caused by the inflow of the liquids may be used if desired. The box should be so arranged that thorough mixing will take place within a short space of time, preferably a few seconds, and then the thus treated alkaline filler is delivered directly to the paper mix at the wet end of the paper machine. As will be apparent, any other device suitable for mixing the alkaline filler and the alum may be used if desired. Even the device of two impinging streams may be used, but I prefer the device described above.

As to the amount of alum to be used, I normally employ from 4 to 8 per cent. alum, figured as dry commercial alum on the dry weight of the alkaline filler. I do not restrict myself however to these figures as either minimum or maximum ones, as it will be apparent from the above detailed description that the temporarily almost neutral or even acid condition is what I desire, and that the amount of alum to use will be determined in each case by the speed of the machine, character of paper, exact point of addition of filler, amount of filler required, degree of agitation of the paper mix, and such other well known variables as will be familiar to those skilled in the art.

Whereas I do not restrict myself to any definite concentrations of alkaline filler suspension and/or alum solution, I have found it convenient to employ alkaline filler at a concentration of approximately three (3) pounds per gallon, and alum solution at a concentration of approximately two tenths (.2) pound per gallon.

Summarizing, then, the use of alum with alkaline filler which is used as a filler in the paper making process according to my invention may be: (1) the addition of a relatively small proportion of alum to the alkaline filler at any time prior to the use of this filler, whereby the pH of the filler is stabilized at or about 8, which procedure is particularly applicable where the alkaline filler is to be employed in the beater or at other point in the concentrated stage of the process; (2) the addition of a relatively small proportion of alum or more if desired, just prior to the introduction of the alkaline filler into the papermaking process, particularly when the filler is used under conditions minimizing the time and/or intimacy of contact with the constituents of the mix, that is, at the wet end of the paper machine. This latter use enables the maintenance for a limited period of the pH of an alkaline filler almost if not practically at the neutral point or even slightly on the acid side of the neutral point. Such use is very advantageous as outlined both in the production of sized and unsized paper and in certain cases results in better sized paper and more foam free paper. In certain cases also it results in economy in the use of alum, as sometimes more than the amount of alum used with the alkaline filler can be deducted from the amount of alum which would otherwise have to be employed at other stage or stages of the process.

Instead of treating the alkaline filler as above with alum, I may employ other suitable material. Such suitable material is acidic material, particularly acids or metallic compounds with an acid reaction, such as compounds of zinc, or compounds of aluminum other than alum. As illustrative of material which I have found to be suitable, I give the following examples: zinc chloride, zinc sulphate, stannous chloride, ferrous sulphate, aluminum chloride, sulphuric acid, hydrochloric acid, lead acetate. Not all of these materials are equally effective, nor effective in exactly the same manner. For example, the acids give low temporary pH values, but not such a low permanent pH as do some of the salts. The zinc salts are very effective in maintaining a relatively low pH for considerable periods of time. The effect of alum has been detailed above. Lead acetate is one of the least effective of the materials mentioned. The use of ferrous sulphate, because of its color, would ordinarily be confined to alkaline filler to be used in papers other than white. Thus, although there are times when one or the other of the substances above or a mixture of two or more of them would be preferred, ordinarily because of its moderate cost and its availability in paper mills, I employ alum.

As is set forth above, within reasonable limits the alkalinity of alkaline filler is of no very great importance in the use of alkaline filler in coating mixes. Of course, it is recognized that very strong alkalinity is not desirable in coating mixes, but alkaline filler which has been properly prepared or washed in the process of its manufacture does not ordinarily suffer from this defect.

On the other hand, alkaline fillers, especially those occurring in very finely divided form, or those which by subjection to treatment such as by grinding, for example, in a ball mill, have had their particle size reduced, have a tendency to produce mixes which are somewhat difficult to brush out or spread on the coating machine, particularly where a mixture of alkaline filler and other filler such as clay is used, and especially where casein is used as the adhesive. I have observed that a mixture such, for instance, as calcium carbonate magnesium hydroxide and clay, where casein is employed as the adhesive, brushes out with more difficulty and has a greater viscosity than a mixture either of the alkaline filler, or of clay alone, with casein. I have discovered, however, that by the treatment of alkaline filler with a small quantity of suitable material, such as alum, prior to the addition of the casein, the viscosity of the mix is appreciably reduced and hence the brushing qualities of the mix are enhanced. I have also found that this reduction of viscosity is not temporary, but apparently persists for the limits of time which coating mixes are ordinarily kept in a coating mill and hence can be considered from the manufacturing point of view as being permanent.

In the practice of that phase of my invention in which the alum treated alkaline filler is used in coating mixes the alum may be added to the alkaline filler prior to the latter's admixture with the adhesive. The alkaline filler is preferably incorporated in a fluid medium such as water to a paste or pulp condition and the alum is preferably added in solution thereto. Or if pigment other than alkaline filler, such as clay, is to be additionally used, the two pigments may first be admixed and the alum added to the mixture. I have found, however, that the prior mixture of the alum and the alkaline filler before its admixture with the clay seems to be more effective in some cases and I therefore consider that my preferable procedure. I may also add alkaline filler, which has been treated with alum, to clay already mixed with an adhesive such as casein, but I ordinarily do not employ this method as it unduly complicates the compounding of the coating mix.

The essential point, however, in mixing the alkaline filler with the alum by any of the procedures outlined, is that the action of the alum on the alkaline filler should be completed prior to the admixture of the casein, because as is well known, alum added to casein results in the coagulation of the mix. This coagulation can at times be overcome by subsequent addition of alkaline material, but it is preferable to avoid such coagulation owing to the difficulties experienced and also to the loss of alum.

Regarding the amount of alum to employ, I have tried various quantities but have found that under ordinary conditions, 1 per cent. on the weight of the dry mineral coating pigments present (i. e. alkaline filler or alkaline filler and other pigment) is sufficient to produce the results desired. I do not restrict myself to this amount as either more or less may be used, but the lowering of the viscosity seems to be almost proportional up to the use of 1 per cent. of alum; however with the use of larger quantities, the rate of change in viscosity drops off with considerable rapidity so that 1 per cent. seems to be about the economical amount to employ under normal circumstances.

In some cases casein is not dissolved independently of the pigments present, as it is in the instances described above wherein by the word "casein" is meant a solution thereof in suitable solvents, but is mixed in the undissolved condition with the pigments and the appropriate solvent or solvents added to dissolve it, if sufficient alkali is not already present in the pigment used, and the entire mix agitated until solution of the casein takes place. Such mixing is usually done in the cold, or at least at a lower temperature than ordinarily employed in dissolving casein by itself.

I have found by experiment that although the alum has an effect in reducing the viscosity of mixes made up in this manner, its effect in some cases does not seem to be so great as when the casein has been dissolved prior to admixture with the pigments, and although I do not limit myself to the previous solution of the casein, I consider that the preferable procedure.

As in the case of treating alkaline filler for use as a filler in paper, I find that in treating alkaline filler for use as a coating pigment I may use suitable material other than alum. Such suitable material is acidic material, particularly acids or metallic compounds with an acid reaction, such as compounds of zinc, or compounds of aluminum other than alum. As illustrative of materials which I have found to be suitable, I give the following examples: sulphuric acid, zinc sulphate.

The mechanism by which alum, or other suitable material as indicated above, reduces the viscosity of the alkaline filler mixes, and particularly of the alkaline filler-clay mixes has not been completely worked out as yet, but my opinion is that the alum or other material acts to destroy or to minimize any colloidal action of the alkaline filler itself, or any colloidal action between the clay and the alkaline filler. However, this action does not probably increase the actual ultimate particle size, as I have not found that it affects in any way the density and solidity of the surface of the papers made with coating mixes containing treated alkaline filler which would probably be the case were the ultimate particle size of the fillers actually increased.

In performing the experiments from which the discoveries disclosed herein regarding the pH of alkaline fillers when treated with suitable material arose, the colorimetric method was used for determining the pH values, and the indicator chiefly relied upon was that known as the "B. D. H. universal indicator", that is, the universal indicator manufactured by "The British Drug Houses, Ltd.", London. In the ranges of the work herein described, this indicator is accurate to approximately .5 pH, and has the following color range:

| pH | Color |
|---|---|
| pH up to 3.0 | Red |
| pH 4.0 | Deeper red |
| pH 5.0 | Orange red |
| pH 5.5 | Orange |
| pH 6.0 | Orange yellow |
| pH 6.5 | Yellow |
| pH 7.0–7.5 | Greenish yellow |
| pH 8.0 | Green |
| pH 8.5 | Bluish green |
| pH 9.0 | Greenish blue |
| pH 9.5 | Blue |
| pH 10.0 | Violet |
| pH 10.5 | Reddish violet |
| pH 11.0 | Deeper reddish violet |

When the pH of a substantially insoluble material such as alkaline filler is spoken of, what is meant, of course, is the pH imparted by the alkaline filler to the liquid immediately surrounding it. The method of test used in performing the experiments, the results of which constitute in part the basis for the disclosures herein regarding the pH values of alkaline filler when treated with suitable material, was to mix in a test tube a relatively concentrated aqueous suspenson of alkalne filler with the quantity of the suitable material to be added in the given test, shake up thoroughly, add sufficient B. D. H. universal indicator to give proper strength of color, shake again, and then either with or without agitation as might be desired for test purposes, allow a certain definite period of time to elapse, and immediately centrifuge the mixture which was still contained in the test tube, whereupon the color of the supernatant liquid would be taken as an indication of the pH value of the alkaline filler at the time that the centrifuging was begun. The centrifuging itself required but a very short time as it was only necessary to secure a small layer of clear liquid above the filler line in order to make the reading.

The action of acidic material on the alkaline filler does not consist merely in neutralizing any small quantity of fortuitously associated soluble impurity having an alkaline reaction, but so far as I have been able to observe it is an action directly upon the alkaline filler itself. If the small quantity of fortuitous soluble alkaline impurity present in an alkaline filler be determined and its stoichiometric equivalent of acidic material be added to such impure alkaline filler, it will be found that the permanent pH of the alkaline filler is not reduced substantially below the pH that such alkaline filler would possess in substantially pure condition, nor will there exist the transitory temporarily lowered pH lasting for an appreciable period of time as outlined above, nor will the alkaline filler possess the property of producing a less viscous coating mix. Hence, in order to practice my invention, it is necessary to add to an alkaline filler, as the minimum amount of acidic material to employ, an amount which is at least greater than that which would be the stoichiometrical equivalent of any soluble alkaline impurity fortuitously associated with such alkaline filler, and where in this description and appended claims I speak of adding acidic material to alkaline filler, I mean that the amount added is minimally limited as above.

The term "paper mix" as used herein is intended to mean a mix of various constituents including fibre from which paper may be made either directly or after the addition of other ingredients.

By the term "alkaline filler" I mean substantially water insoluble filler which when agitated in contact with freshly boiled distilled water, say for an hour, will impart a pH value to such water greater than 7.0, that is, which will be on the alkaline side of the neutral point. Among fillers included in this group may be mentioned calcium carbonate, of which lime mud from the causticizing process is one form; calcium carbonate magnesium basic carbonate employed in the paper disclosed in my U. S. Patent No. 1,595,416 of August 10, 1926; calcium carbonate magnesium hydroxide disclosed in my U. S. Patent No. 1,415,391 of May 9, 1922; and other substantially water insoluble normal or basic carbonates of alkaline earth metals, (which expression is herein intended to include magnesium), or compounds, double salts, or physically associated mixtures of these with one or more other acid soluble materials of a substantially water insoluble nature.

When I use the word "paper" herein, I use it in the broad sense to include products of manufacture of all types and of all weights and thicknesses, which contain as an essential constituent a considerable amount of prepared fibre and which are capable of being produced on a Fourdrinier, cylinder, or other forming, felting, shaping or molding machine.

By the term "wet end of the paper machine", I intend to include those instrumentalities employed in paper manufacture by which and/or in which a relatively concentrated paper mix is diluted, and treated, conveyed or fed up to the point of web-formation, such as the mixing box, regulating and proportioning devices, rifflers, troughs, screens, head boxes, inlets, and the like, including also instrumentalities used in the white water cycle.

It is to be understood that my invention is not dependent upon or limited by any theory expressed herein.

While I have described in detail the preferred embodiments of my invention, it is to be understood that the details of procedure, the proportions of ingredients, and the arrangement of steps may be widely varied without departing from the spirit of my invention or the scope of the subjoined claims.

I claim:

1. In a method of making paper which includes alkaline filler as one of its ingredients, the improvement which comprises reducing the pH value of alkaline filler by treating alkaline filler with water soluble acidic material prior to the use of said alkaline filler in making said paper.

2. In a method of making paper which includes alkaline filler as one of its ingredients, the improvement which comprises effecting a substantially stable reduction in the pH value of alkaline filler so that said value shall not substantially exceed 8 by treating alkaline filler with a metallic compound having an acidic reaction prior to the use of said alkaline filler in making said paper.

3. In a method of making paper which includes alkaline filler as one of its ingredients, the improvement which comprises effecting a substantially stable reduction in the pH value of alkaline filler so that said value shall not substantially exceed 8 by treating alkaline filler with a water-soluble non-alkaline compound of aluminum prior to the use of said alkaline filler in making said paper.

4. In a method of making paper which includes alkaline filler as one of its ingredients, the improvement which comprises effecting a substantially stable reduction in the pH value of alkaline filler so that said value shall not substantially exceed 8 by treating alkaline filler with alum prior to the use of said alkaline filler in making said paper.

5. In a method of making paper which includes alkaline filler as one of its ingredients, the improvement which comprises effecting a substantially stable reduction in the pH value of alkaline filler so that said value shall not substantially exceed 8 by treating alkaline filler with alum in an aqueous medium prior to the use of said alkaline filler in making said paper.

6. In a method of making paper which includes as one of its ingredients alkaline filler comprising alkaline earth metal carbonate, the improvement which comprises reducing the pH value of said alkaline filler by treating said alkaline filler with water soluble acidic material prior to the use of said alkaline filler in making said paper.

7. In a method of making paper which includes as one of its ingredients alkaline filler comprising calcium carbonate, the improvement which comprises reducing the pH value of said alkaline filler by treating said alkaline filler with water soluble acidic material prior to the use of said alkaline filler in making said paper.

8. In a method of making paper which includes as one of its ingredients alkaline filler comprising calcium carbonate and magnesium compound, the improvement which comprises reducing the pH value of said alkaline filler by treating said alkaline filler with water soluble acidic material prior to the use of said alkaline filler in making said paper.

9. In a method of making paper which includes as one of its ingredients alkaline filler comprising calcium carbonate magnesium hydroxide, the improvement which comprises reducing the pH value of said alkaline filler by treating said alkaline filler with water soluble acidic material prior to the use of said alkaline filler in making said paper.

10. In a method of making paper which includes as one of its ingredients alkaline filler comprising calcium carbonate magnesium hydroxide, the improvement which comprises effecting a substantially stable reduction in the pH value of said alkaline filler so that said value shall not substantially exceed 8 by treating said alkaline filler with alum prior to the use of said alkaline filler in making said paper.

11. In a method of making paper which includes very finely divided alkaline filler as one of its ingredients, the improvement which comprises reducing the pH value of said alkaline filler by treating said alkaline filler with water soluble acidic material prior to the use of said alkaline filler in making said paper.

12. In a method of making paper which includes alkaline filler as one of its ingredients, the particle size of said alkaline filler having been reduced, the improvement which comprises reducing the pH value of said alkaline filler by treating said alkaline filler with water soluble acidic material prior to the use of said alkaline filler in making said paper.

13. In a method of making paper which includes alkaline filler as one of its ingredients, the particle size of said alkaline filler having been reduced by grinding, the improvement which comprises reducing the pH value of said alkaline filler by treating said alkaline filler with water soluble acidic material prior to the use of said alkaline filler in making said paper.

14. The method of making paper filled with alkaline filler comprising reducing the pH value of said alkaline filler by treating alkaline filler with water soluble acidic material prior to the addition of said alkaline filler to a paper mix, then adding said treated filler to said paper mix, and thereafter making paper from said resulting paper mix.

15. The method of making paper filled with alkaline filler comprising reducing the pH value of said alkaline filler by treating alkaline filler with water soluble acidic material just prior to the addition of said alkaline filler to a paper mix, then adding said treated alkaline filler to said paper mix, and thereafter making paper from said resulting paper mix.

16. The method of making paper filled with alkaline filler comprising treating alkaline filler with acidic material just prior to the addition of said alkaline filler to a paper mix, then adding said treated alkaline filler to said paper mix under conditions favoring the minimizing of the time of contact of the constituents of the mix, and thereafter making paper from said resulting paper mix.

17. The method of making paper filled with alkaline filler comprising treating alkaline filler with acidic material just prior to the addition of said alkaline filler to a paper mix, then adding said treated alkaline filler to said paper mix under conditions favoring the minimizing of the time and intimacy of contact of the constituents of the mix, and thereafter making paper from said resulting paper mix.

18. The method of making paper filled with alkaline filler comprising treating alkaline filler with acidic material just prior to the addition of said alkaline filler to a paper mix, then adding said treated alkaline filler to said paper mix at the wet end of the paper machine, and thereafter making paper from said resulting paper mix.

19. The method of making paper filled with alkaline filler comprising treating alkaline filler with alum just prior to the addition of said alkaline filler to a paper mix, then adding said treated alkaline filler to said paper mix at the wet end of the paper machine, and thereafter making paper from said resulting paper mix.

20. The method of making paper filled with alkaline filler comprising treating alkaline filler with alum just prior to the addition of said alkaline filler to a paper mix, then adding said treated alkaline filler and alum to said paper mix at the wet end of the paper machine, and thereafter making paper from said resulting paper mix.

21. The method of making paper filled with alkaline filler comprising treating alkaline filler with alum just prior to the addition of said alkaline filler to a paper mix, then adding said treated alkaline filler, size, and alum to said paper mix at the wet end of the paper machine, and thereafter making paper from said resulting paper mix.

22. The method of making paper filled with alkaline filler comprising treating alkaline filler with alum just prior to the addition of said alkaline filler to a paper mix, then adding said treated alkaline filler, rosin size, and alum to said paper mix at the wet end of the paper machine, and thereafter making paper from said resulting paper mix.

23. The method of making paper filled with alkaline filler comprising treating alkaline filler with alum just prior to the addition of said alkaline filler to a paper mix, then adding said treated alkaline filler, size, starch and alum to said paper mix at the wet end of the paper machine, and thereafter making paper from said resulting paper mix.

24. The method of making paper filled with alkaline filler comprising treating alkaline filler with alum just prior to the addition of said alkaline filler to a paper mix, then adding said treated alkaline filler, size, starch, sodium silicate and alum to said paper mix at the wet end of the paper machine, and thereafter making paper from said resulting paper mix.

25. The method of making paper coated with alkaline filler comprising treating alkaline filler with acidic material, mixing said treated filler with an adhesive, and applying the resultant mixture to the surface of paper.

26. The method of making paper coated with alkaline filler comprising treating alkaline filler with a metallic compound having an acidic reaction, mixing said treated filler with an adhesive, and applying the resultant mixture to the surface of paper.

27. The method of making paper coated with alkaline filler comprising treating alkaline filler with alum, mixing said treated filler with an adhesive, and applying the resultant mixture to the surface of paper.

28. The method of making paper coated with alkaline filler comprising treating very finely divided alkaline filler with acidic material, mixing said treated filler with an adhesive, and applying the resultant mixture to the surface of paper.

29. The method of making paper coated with alkaline filler comprising treating alkaline filler, whose particle size has been reduced, with acidic material, mixing said treated filler with an adhesive, and applying the resultant mixture to the surface of paper.

30. The method of making paper coated with alkaline filler comprising treating alkaline filler and other pigment with acidic material, mixing said treated filler and other pigment with an adhesive, and applying the resultant mixture to the surface of paper.

31. Alkaline filler, suitable for use as a raw material in the paper industry, comprising alkaline filler pretreated with water soluble acidic material.

32. Alkaline filler with a pH value not substantially greater than 8, suitable for use as a raw material in the paper industry, comprising alkaline filler pretreated with a metallic compound having an acidic reaction.

33. Alkaline filler with a pH value not substantially greater than 8, suitable for use as a raw material in the paper industry, comprising alkaline filler pretreated with alum.

34. The method of using alkaline filler with a pH value not substantially greater than 8 comprising mixing water soluble acidic material therewith and promptly utilizing said treated alkaline filler in the paper making operation.

35. The method of using alkaline filler involving the reduction of the pH of said alkaline filler comprising mixing alum therewith and promptly utilizing said treated alkaline filler in the paper making operation.

36. As a new composition of matter, an alkaline filler involving the reduction of the pH of said alkaline filler having a transitory pH value less than 8, suitable for use in the manufacture of paper filled with alkaline filler, wherein alkaline filler is added to the paper mix under conditions favoring the minimizing of the time and/or intimacy of contact of the constituents of the mix.

37. As a new composition of matter, the transitory product with a pH value of less than 8 resulting from mixing alkaline filler and water soluble acidic material in an aqueous medium, suitable for use in the manufacture of paper filled with alkaline filler, wherein alkaline filler is added to the paper mix under conditions favoring the minimizing of the time and/or intimacy of contact of the constituents of the mix.

38. As a new composition of matter, the transitory product with a pH value of less than 8 resulting from mixing alkaline filler and alum in an aqueous medium, suitable for use in the manufacture of paper filled with alkaline filler, wherein alkaline filler is added to the paper mix under conditions favoring the minimizing of the time and/or intimacy of contact of the constituents of the mix.

39. A coating mix for coating paper comprising alkaline filler, pretreated with acidic material, and adhesive.

40. A coating mix for coating paper comprising alkaline filler, pretreated with alum, and adhesive.

41. A coating mix for coating paper comprising alum treated alkaline filler and casein.

42. A coating mix for coating paper comprising alum treated alkaline filler and other pigment and adhesive.

In testimony whereof I affix my signature.

HAROLD ROBERT RAFTON.

CERTIFICATE OF CORRECTION.

Patent No. 1,879,483. September 27, 1932.

HAROLD ROBERT RAFTON.

It is hereby certified that error appears in the printed specification of the above numbered patent requiring correction as follows: Page 8, line 17, claim 31, after "filler" insert the words "with a pH value not substantially greater than 8"; lines 31 and 32, claim 34, strike out the words "with a pH value not substantially greater than 8" and insert instead "involving the reduction of the pH of said alkaline filler"; and lines 42 and 43, claim 36, strike out the words "involving the reduction of the pH of said alkaline filler"; and that the said Letters Patent should be read with these corrections therein that the same may conform to the record of the case in the Patent Office.

Signed and sealed this 20th day of December, A. D. 1932.

(Seal)

M. J. Moore,
Acting Commissioner of Patents.